United States Patent
Circenis et al.

(10) Patent No.: US 6,845,474 B2
(45) Date of Patent: Jan. 18, 2005

(54) PROBLEM DETECTOR AND METHOD

(75) Inventors: Edgar Circenis, Loveland, CO (US); Brad Klein, Windsor, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 523 days.

(21) Appl. No.: 09/948,757

(22) Filed: Sep. 10, 2001

(65) Prior Publication Data

US 2003/0051191 A1 Mar. 13, 2003

(51) Int. Cl.[7] .................................................. G06F 11/00
(52) U.S. Cl. .............................. 714/48; 714/47; 714/26
(58) Field of Search ............................. 714/48, 47, 26, 714/25

(56) References Cited

U.S. PATENT DOCUMENTS

| | | | | |
|---|---|---|---|---|
| 5,696,701 A | * | 12/1997 | Burgess et al. | 714/25 |
| 6,148,338 A | * | 11/2000 | Lachelt et al. | 709/224 |
| 6,170,067 B1 | * | 1/2001 | Liu et al. | 714/48 |
| 6,189,117 B1 | * | 2/2001 | Batchelor et al. | 714/48 |
| 6,425,006 B1 | * | 7/2002 | Chari et al. | 709/224 |
| 6,477,667 B1 | * | 11/2002 | Levi et al. | 714/57 |
| 6,516,429 B1 | * | 2/2003 | Bossen et al. | 714/47 |
| 6,691,250 B1 | * | 2/2004 | Chandiramani et al. | 714/25 |
| 6,708,291 B1 | * | 3/2004 | Kidder | 714/39 |
| 6,718,489 B1 | * | 4/2004 | Lee et al. | 714/43 |
| 2001/0007140 A1 | * | 7/2001 | Landry et al. | 714/48 |
| 2002/0087383 A1 | * | 7/2002 | Cogger et al. | 705/10 |

* cited by examiner

*Primary Examiner*—Robert Beausoliel
*Assistant Examiner*—Yolanda Wilson

(57) ABSTRACT

A problem detection system detects problems related with operation of a computer system, its hardware components, application programs, and databases. The problem detection system begins by gathering or discovering initial data from one or more of the hardware components, application programs, and databases. The problem detection system may then update this data over time. The problem detection system includes mechanism for discovering problems in the computer system. The problem detection system also includes mechanisms for reporting problems to a user of the computer system or to a system administrator. The problem detection system may report the problems to other components of the computer system, may store data related to the problems, and may present the problem information to the user through a separate display.

13 Claims, 8 Drawing Sheets

PROBLEM DETECTOR AND METHOD

TECHNICAL FIELD

The technical field is software systems designed to monitor performance of a computer system.

BACKGROUND

Performance of modern computer systems, including networked computer servers, may degrade for a variety of reasons, many of which relate to the use of shared resources including disk bandwidth, memory capacity, and central processing unit (CPU) utilization. Other systems may degrade because of hardware/software failure of individual components and computers. Information technology (IT) system administrators track performance of their computer systems to ensure optimum performance. Performance monitoring and system configuration software provides system administrators with the tools necessary to track system performance and to diagnose problems. The performance monitoring software may provide immediate performance information about a computer system, allow the administrator to examine computer system activities, identify and resolve bottlenecks, and tune the computer system for more efficient operation. The performance monitoring software may keep a history of the computer system performance, monitoring performance as a background task, and may send alarms for impending performance problems.

In order to examine performance, the performance monitoring and system configuration software must first collect performance and configuration information. This information may be provided by the Operating System, software probes, or applications. Metrics derived from this information may be organized in several different ways, including by resource, or from a global level down to an application level (groups of processes), then to a process or individual thread level. Metrics derived by performance monitoring and system configuration software can include CPU and memory utilization, time spent waiting for different system resources, queue lengths, application-specific table and status information, and application response time. Current performance monitoring and system configuration software may require that a user or system administrator specifically invoke the tool in order to detect problems or degradation within the computer system. Further, a user may try to perform a task, and expand considerable resources in that effort, before a problem is even detected.

SUMMARY

Services and their associated applications and processes that run on current computer systems often do not provide the type of information needed to determine how well the services are performing. Other services provide information, but in a manner that is not consistent from application to application. Still other services require specific invocation, and may allow a user to try to complete a task that is not capable of being completed. As a result, administrators of the services often cannot gauge their performance or take actions to prevent performance degradation.

To achieve consistent service health and configuration metrics, a problem detector and a corresponding method gather various measurements that relate to the service under observation. This information may be generated independently from specific provider applications and performance and configuration monitoring tool sets. The output of the method may be in the form of a programmatic or scriptable interface to be used by high-level performance tools that are capable of reporting status of many disparate computer services. The performance tools may reside on different systems and architectures and may be supplied by different vendors. As a result, the programmatic or scriptable interfaces to access the metrics are designed to be generic and flexible.

In particular, to provide enhanced detection of hardware and software problems in a computer system, a problem detection mechanism is disclosed. In an embodiment, the problem detection mechanism may include a main problem detector, comprising one or more individual problem detectors, wherein each of the one or more individual problem detectors is based on a specific potential problem in the computer system, and wherein the individual problem detectors detect the specific potential problems when existing; a problem resolver that determines if a detected problem is a new problem or an old problem; an interface module that presents information related to the computer system to a user, wherein if all the detected problems are old problems, the interface module presents an application program; and if one or more of the detected problems are new problems, the interface module displays the new problems.

In an aspect of the embodiment of the problem detection mechanism, wherein the main problem detector routine is invoked upon startup of the problem detection mechanism and wherein the interface module presents a user with an option to continue or not continue, if the user chooses to continue, the interface module presents the application program; and if the user chooses not to continue, the application program terminates. In another aspect, the user may refresh the problem detection mechanism.

In another aspect, the problem detection mechanism includes a data discovery module, wherein invoking the problem detector routine starts the data discovery module, and a data cache coupled to the data discovery module, wherein data discovered by the data discovery module is stored; the interface module comprises an application menu, wherein the application menu includes selections for run problem detection routine and refresh application data; and the mechanism includes a problem cache, wherein detected problem information is stored, a problem cache, wherein detected problem information is stored.

In still another aspect, wherein the main problem detector is invoked upon instruction from a main application program, and wherein the main problem detector detects the one or more problems, wherein the interface module displays all problems, the interface module includes a mechanism whereby the user may designate an instruction to close the problem display.

In an embodiment, the method for detecting problems in a computer system comprises invoking a main problem detection routine; invoking individual problem detection routines based on the main problem detection routine; detecting one or more problems in the computer system; determining if the one or more detected problems are one of new problems and old problems; if all the one or more detected problems are old problems, presenting an application program; and if one or more of the one or more detected problems are new problems, displaying the new problems. In one aspect of the embodiment, the main problem detection routine is invoked upon startup of the problem detection tool, and the method further comprises presenting a user with an option to continue or not continue, if the user chooses to continue, presenting the application program; and if the user chooses not to continue, terminating the application program. In another aspect of the method, the step of invoking the problem detection routine launches a data discovery routine, further comprising storing the discovered data. In yet another aspect the method further comprises presenting an application menu, wherein the application menu includes selections for run problem detection routine and refresh application data. In still another aspect of the embodiment the main problem detection routine is invoked upon instruction from a main application program, and wherein the main problem detection routine detects the one or more problems, and the method further comprises displaying all problems; and receiving a user instruction to close the problem display. In another aspect of the embodiment, the main problem detection routine is invoked upon receipt of a refresh application data command, and the method further comprises receiving a user instruction to close the problem display. In still another aspect, the step of invoking the problem detection routine launches a data discovery routine, and the method further comprises storing the discovered data, and storing the detected problems. In an aspect, the detected problems may be hardware problems and software problems.

DESCRIPTION OF THE DRAWINGS

The detailed description will refer to the following drawings, in which like numbers refer to like items, and in which.

DETAILED DESCRIPTION

Modem computer systems, including networked computers, and the services that are provided by them, are subject to performance degradation for a variety of reasons, many of which relate to the use of shared resources including disk bandwidth, memory capacity, and central processing unit (CPU) utilization and others that are related to hardware features or incompatibility. Information technology (IT) system administrators track performance of their computer systems to ensure optimum allocation of these and other shared resources and to monitor hardware performance. Performance monitoring and system configuration software provides system administrators with the tools necessary to track system performance and to diagnose problems. The software may provide immediate performance information about a computer system, allow the administrator to examine computer system activities, identify and resolve bottlenecks, and tune the computer system for more efficient operation. System administrators are interested in tracking performance and configuration of their computer systems to ensure optimum allocation of these and other shared resources. Performance management software provides the administrator with the tools necessary to continually track computer system performance and diagnose problems. The performance management software provides immediate performance information about a computer system, allows the administrator to examine computer system activities, identify and resolve bottlenecks, and tune the computer system for more efficient operation.

The output of the performance monitoring and system configuration software may be either in the form of a programmatic or scriptable interface to be used by high-level monitoring tools that are capable of reporting status of many disparate computer services. The tools may reside on different systems and architectures and may be supplied by different vendors. To accommodate different monitoring tools, the interfaces are generic and flexible.

Figure 1:
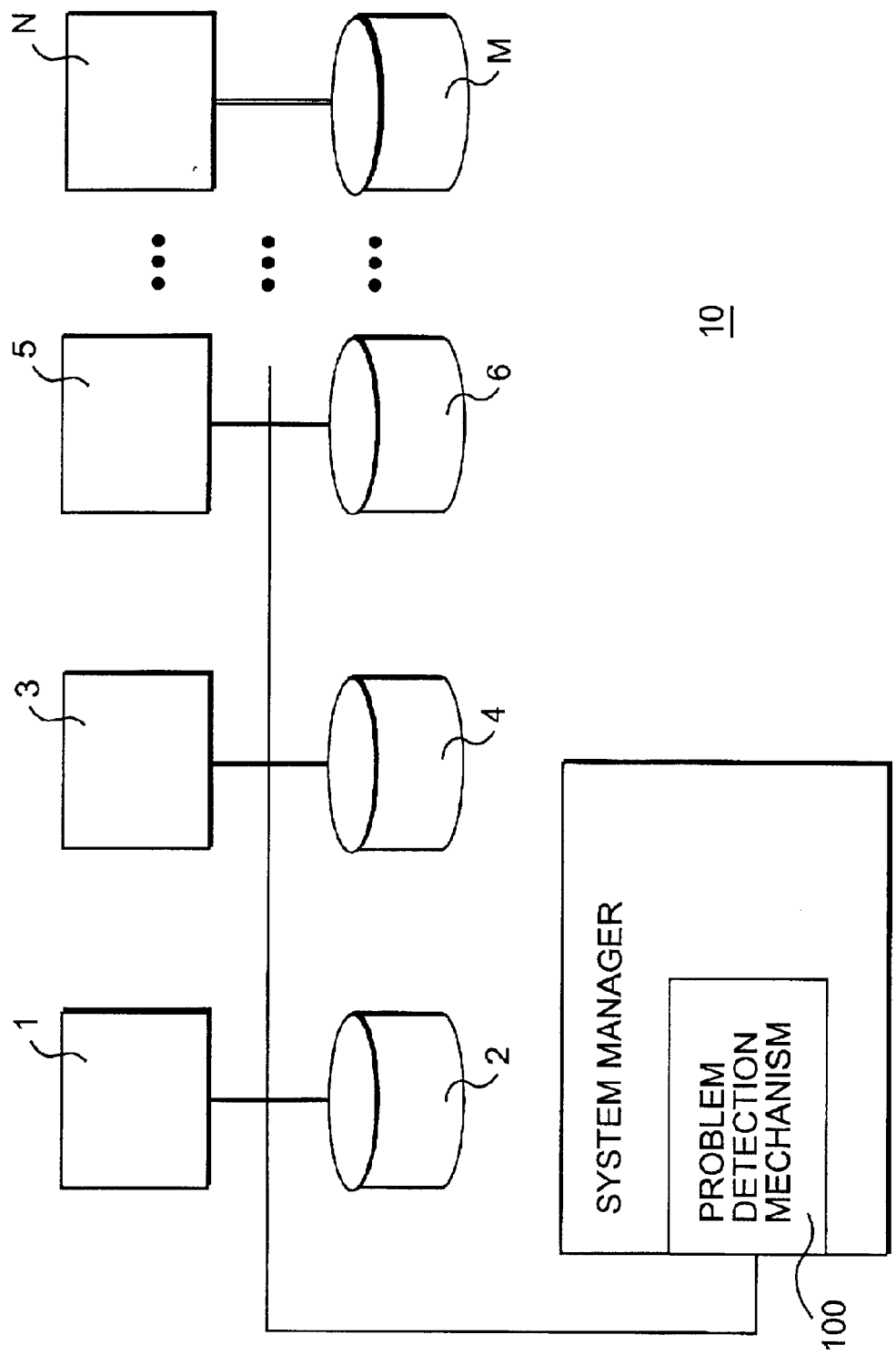
FIG. 1 is a block diagram of a system that employs a problem detector and method.

FIG. 1 is a block diagram of a computer system 10 that employs a problem detection system 100. The computer system may comprise a number of hardware components or application programs 1, 3, 5, N and a number of databases 2, 4, 6, M. The problem detection system 100 monitors health and configuration of each of the components, programs and databases in the computer system 10. In particular, the problem detection system 10 detects problems related with operation of the computer system 10, its hardware components, application programs, and databases. The problem detection system 100 includes means for discovering problems in the computer system 10. The means for discovering problems may employ various instrumentation packages that (such as the Application Response Measurement (ARM) industry standard) can be used to provide this data. Performance information can also be supplied by plug-in instrumentation. Many applications have plug-in modules customized specifically to an application. The plug-in modules are used by the performance monitoring tools to provide status. Examples are monitoring packages available with database packages. These plug-ins vary in their implementation, interfaces, and applicability. A flexible interface allows the use of plug-in instrumentation data as a source to the problem detection system 100 without requiring changes to the externally-supplied plug-in or underlying application.

The problem detection system 100 begins operation by gathering or discovering initial data from one or more of the hardware components, application programs, and databases. The problem detection system 100 may then update this data over time. The problem detection system 100 also includes means (not shown in FIG. 1) for reporting problems to a user of the computer system 10 or to a system administrator (not shown in FIG. 1) of the computer system 10. The problem detection system 100 may report the problems to other components of the computer system 10, may store data related to the problems, and may present the problem information to the user through a separate display (not shown in FIG. 1).

The problem detection system 100 is capable of detecting problems such as the use of shared resources including disk bandwidth, memory capacity, and central processing unit; missing/failed connectors and cables; misnumbered or duplicate cabinets or components; illegal connection of I/O components to processing components; incomplete hardware or software connections between hardware and software components; failed I/O components; failed cooling systems; failed power supplies; inadequate cooling; and other hardware and software-related problems. The problem detection system 100 can then determine the possible effect of the problem, can present options to a user of the computer system 10, and can receive instructions from the user related to further operation of the computer system 10.

Figure 2:
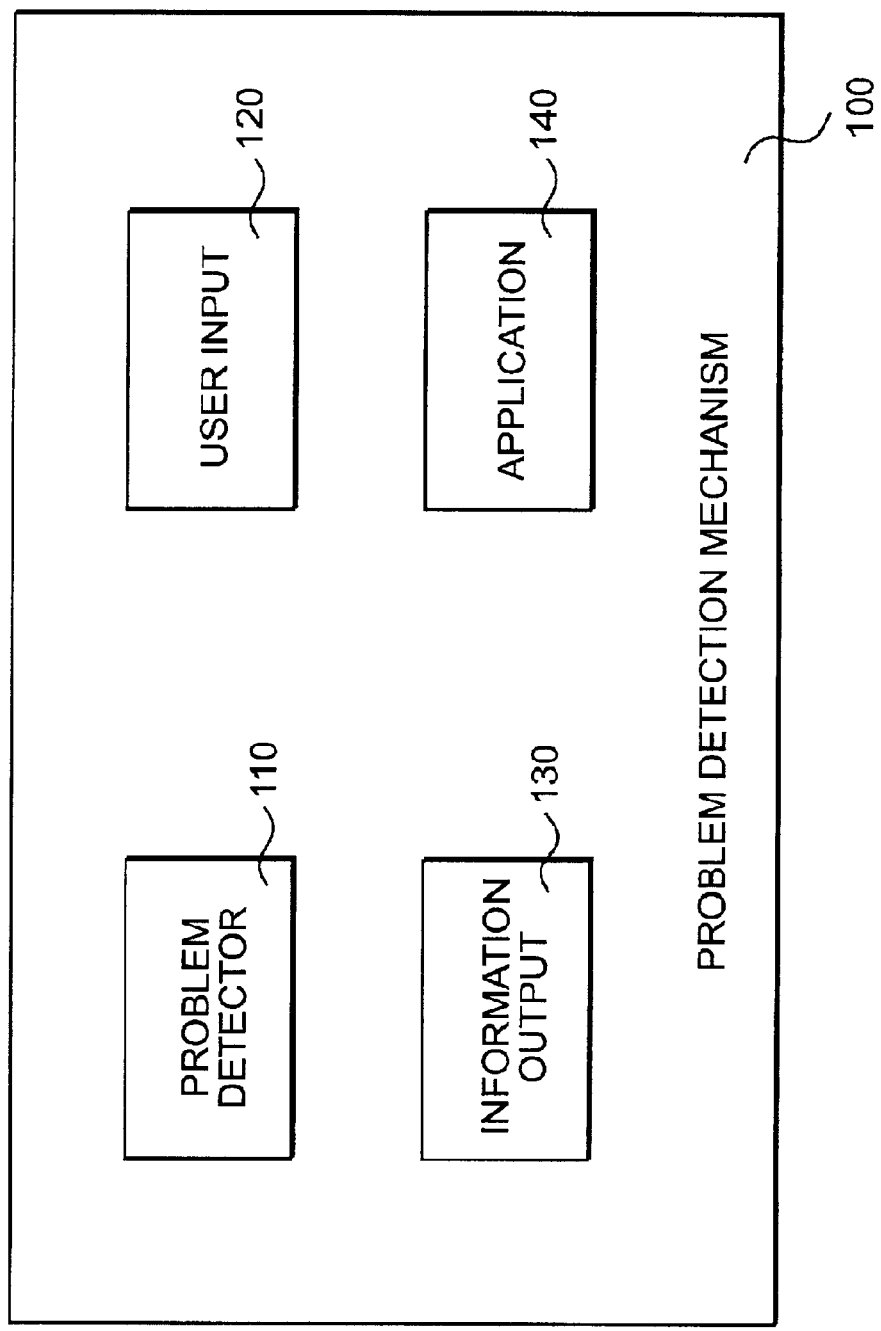
FIG. 2 is a block diagram of a problem detection system.

FIG. 2 is a simple block diagram of the problem detection system 100. The system 100 includes a problem detector 110, a user input 120 coupled to the problem detector 110, and an information output module 130 also coupled to the problem detector 100. Also shown in FIG. 2 is an application 140 comprising a number of tasks, or operations, that may be monitored by the problem detection system 100.

Figure 3:
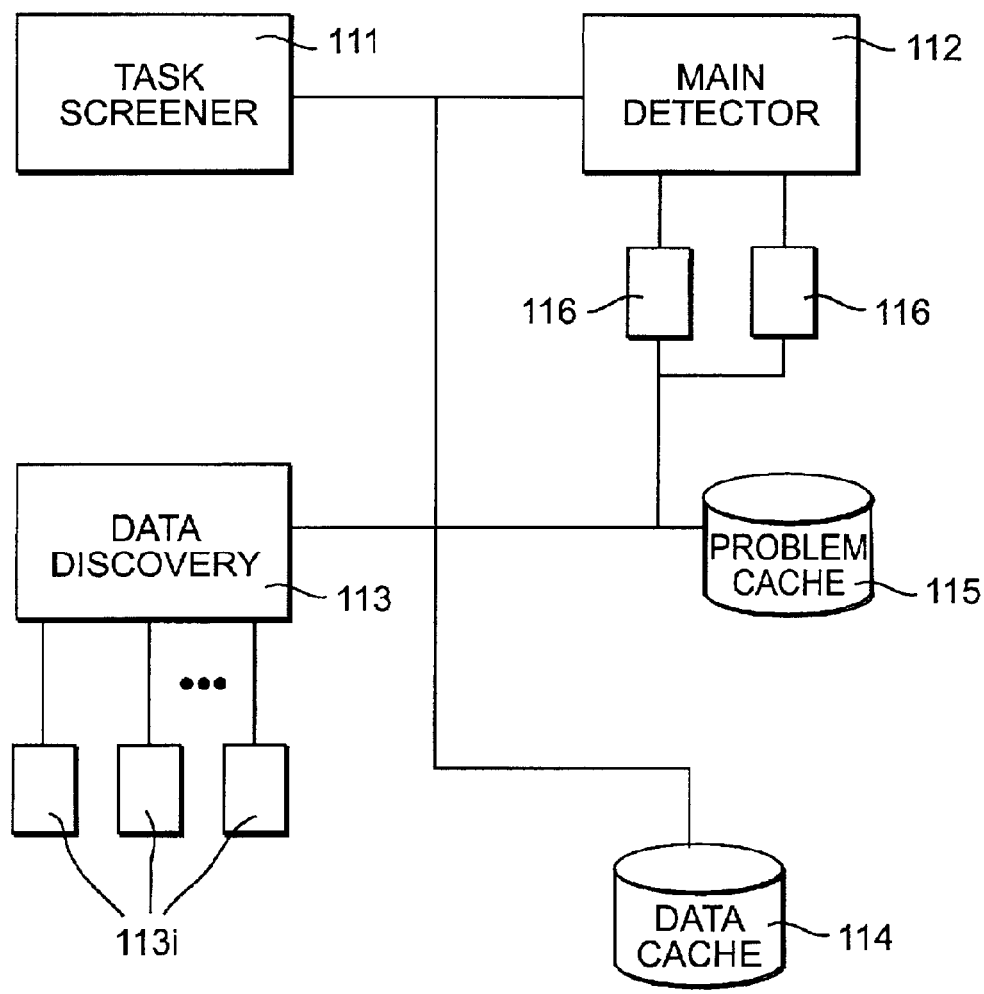
FIG. 3 is an overall block diagram of a problem detector used with the system of FIG. 2 to determine the health of a service hosted on the system.

FIG. 3 shows the problem detector 110 in detail. The problem detector 110 includes a task screener 111, a main detector 112 coupled to the task screener 111, a data discovery module 113 coupled to the task screener 111 and the main detector 112, a data cache 114, and a problem cache 115. The task screener 111 provides means for determining which tasks of an application program, and which hardware devices, are capable of being monitored by the main detector 112. The main detector 112 provides means for detecting problems in the application programs and hardware devices. The main detector 112 may comprise a series of functions, or individual detectors 116, with each of the individual detectors 116 designed to detect problems with a specific application program or a specific hardware device, or a group of application programs or a group of hardware devices. The data discovery module 113 provides means for discovering data related to the computer system 10, including individual application programs, hardware devices and databases. The data discovery module may comprise individual modules $113_i$, each associated with one of the individual detectors 116. The data discovery module 113, and the individual modules 113$i$ may use various instrumentation packages (such as the Application Response Measurement (ARM) industry standard) to provide this data. Performance information can also be supplied by plug-in instrumentation. Many applications have plug-in modules customized specifically to an application. The plug-in modules are used by the data discovery module 113 to provide status. Other examples are monitoring packages available with database packages. These plug-ins vary in their implementation, interfaces, and applicability. A flexible interface to the data discovery module 113 allows the use of plug-in instrumentation without requiring changes to the externally-supplied plug-in or underlying application.

The data cache 114 provides means for storing the discovered data. The problem cache 115 provides means for storing individual problems and related information collected by the main detector 112 and the individual detectors 116.

The main detector 112 may function as a composite detector that causes the individual detectors 116 to run. This arrangement of the main detector 112 and the individual detectors 116 allows for detection of hardware/software problems at optimum speeds. That is, because some individual detectors 116 may require data detection that is more extensive than that of other individual detectors 116, some individual detectors 116 may complete their problem detection and reporting tasks before those with more extensive discovery. Using individual detectors 116 thereby speeds up the overall problem detection process.

The main detector 112 may be invoked upon computer system 10 start-up; periodically (automatically, or user-initiated) and upon application data refresh operations, for example. Invocation following application data refresh may be necessary because the refresh operation may generate new problems. In an embodiment, some individual detectors 116 may not run upon computer system 10 start-up, or may not run following application data refresh. For example, individual detectors 116 that are designated to detect problems requiring significant discovery may not run during start-up of the computer system 10. An individual detector 116 may retain the latest state of the components the individual detector 116 is designated to monitor. The state may include any previously-identified and unresolved problems (an old problem), and other information related to the components.

Figure 4:
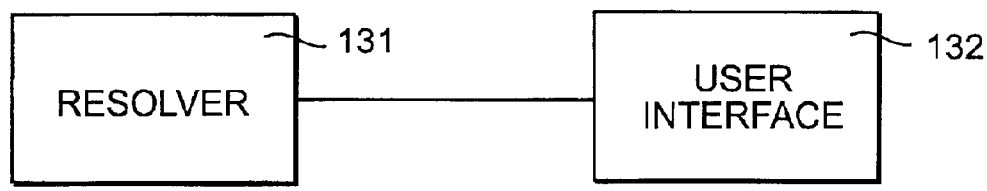
FIG. 4 is a block diagram of an information output module used with the system of FIG. 2.

FIG. 4 is a block diagram of the information output module 130. The output module 130 provides means for reporting problems to users of the computer system 10, including system administrators and other applications, for example. The output module 130 includes a problem resolver 131 that provides means for determining if a problem has been detected by the main detector 112, or one of the individual detectors 116, and means for resolving if the detected problem is an old problem or a new problem. The output module 130 also includes a user interface module 132 that provides means for informing and prompting the user regarding certain problems, and means for receiving instructions from the user related to the identified problems.

Figure 5A:
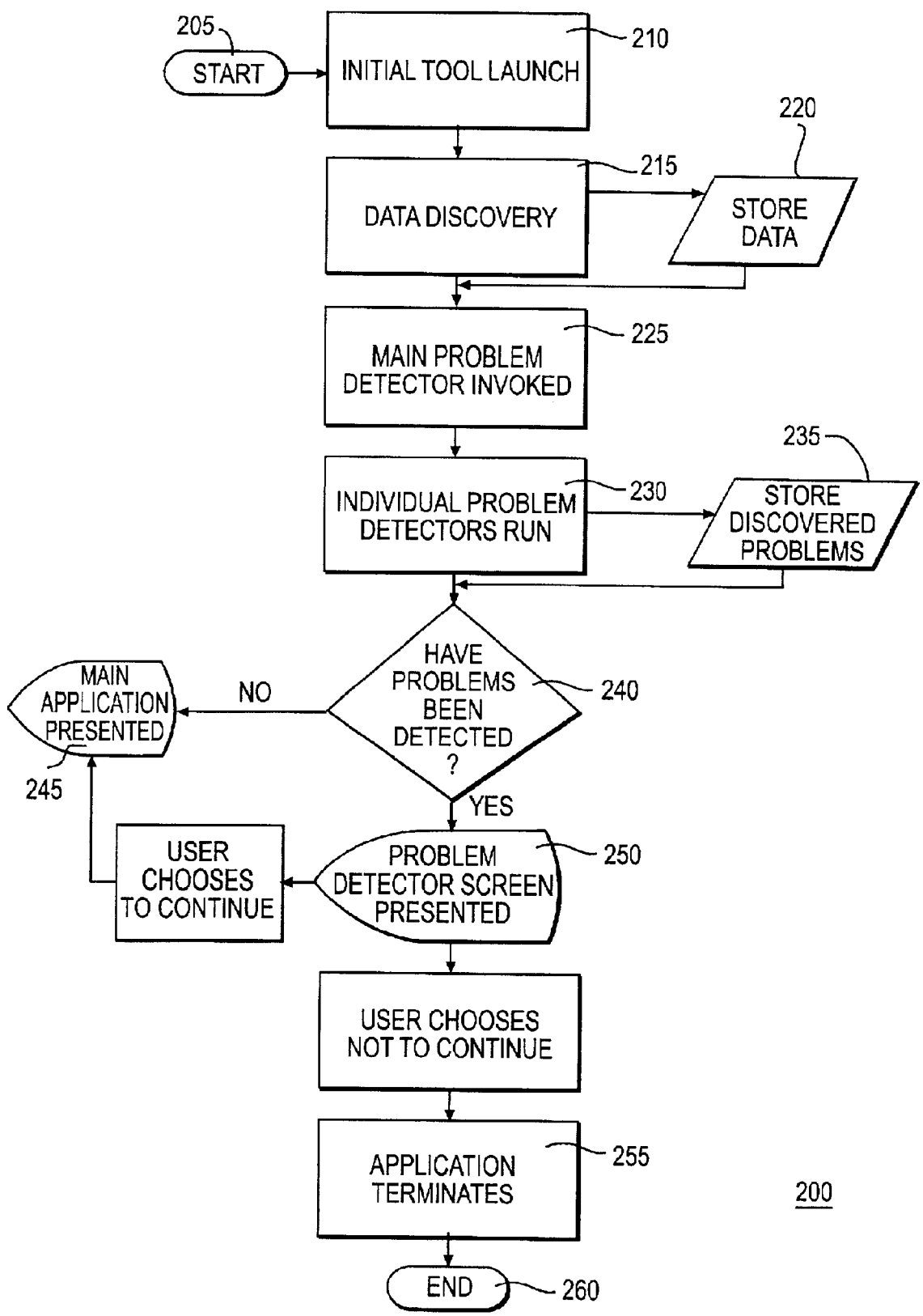
FIGS. 5A–5C are flowcharts illustrating operations of the problem detection system of FIG. 2.

FIG. 5A is a flowchart showing a problem detector invocation operation 200 upon start up of the problem detection system 100 of FIG. 2. The operation 200 begins with start block 205. In tool launch block 210, the problem detection system 100 is started. In block 215, the data discovery module 113 (or individual data discovery modules $113_i$ associated with corresponding problem detectors 116) conduct data discovery. The discovered data are then stored in the data cache 114, block 220. In block 225, the main detector 112 is invoked. Next, in block 230, individual detectors 116 are invoked. If the individual detectors 116 detect any problems, such problems are stored in the problem cache 115, block 235. In block 240, the problem resolver 131 determines if any problems have been detected. If no problems have been detected, the operation 200 moves to block 245, and the main application is presented. In block 240, if the problems resolver 131 determines that problems have been detected, the operation moves to block 250, and the output module 132 present a problem detector screen with a prompt to the user to continue or to discontinue. If the user elects to continue, the process 200 moves to block 245, and the main application is presented. In block 250, if the user elects not to continue, the operation 200 moves to block 255, and the main application ends. The operation 200 then ends, block 260.

Figure 5B:
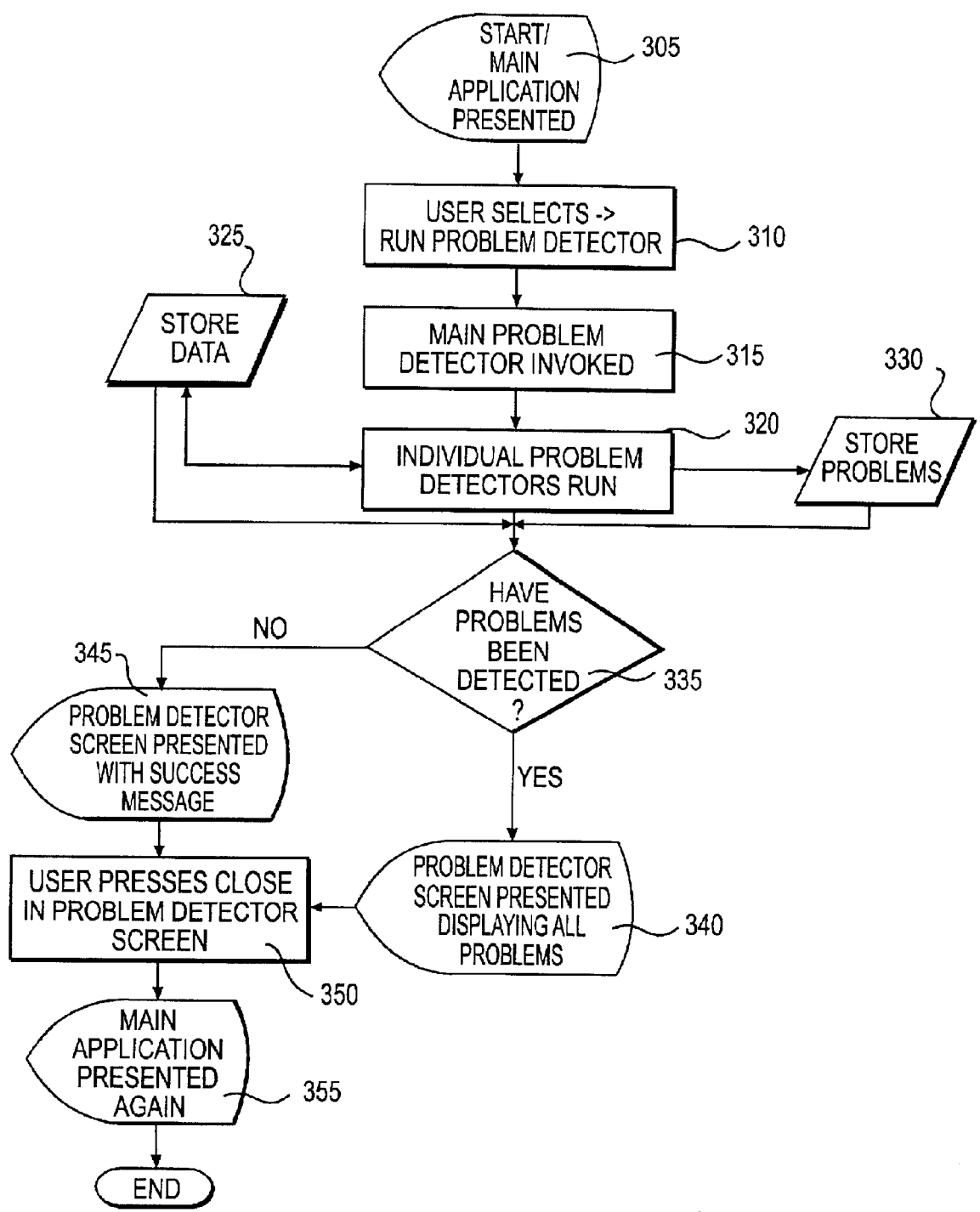

FIG. 5B is a flowchart illustrating a problem detector operation 300 invoked from a main application window. The operation 300 begins with block 305. In block 310, the problem detection system 100 receives the user selection >run_problem_detector< from an application menu. In block 315, the main problem detector 112 is invoked. In block 320, the individual detectors 116, and their corresponding discovery mechanisms are run to discover data and to detect problems. Any discovered data are stored in the data cache 114, block 325. Any detected problems are stored in the problems cache 115, block 330. The operation 300 then moves to block 335, and the resolver 131 determines if any problems were detected. If problems were discovered, the operation 300 moves to block 340. If problems were not discovered, the operation 300 moves to block 345.

In block 340, the problem detector screen is presented displaying all problems, including old problems and new problems. In block 345, the problem detector screen is presented containing a success message. Following either block 340 and 345, the operation moves to block 350 and the problem detection system 100 receives a CLOSE command from the user. The operation 300 then moves to block 355 and the main application program is presented. The operation 300 then moves to end block 360 and ends.

Figure 5C:
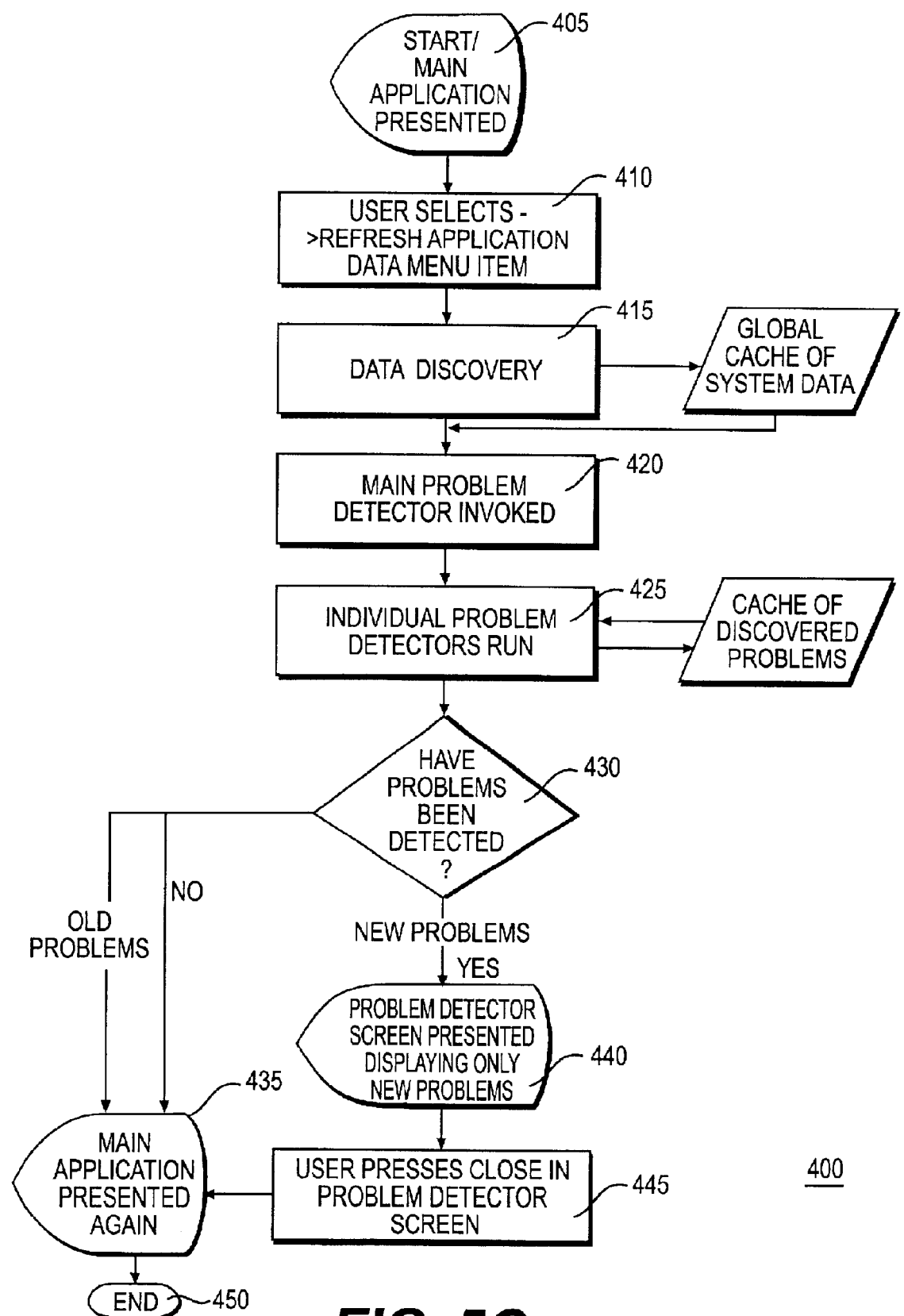

FIG. 5C is a flowchart illustrating a problem detector operation 400 invoked due to application data refresh. The operation 400 begins with start block 405. In block 410, the problem detection system 100 receives a user-selected action >refresh application data<. In block 415, the data discovery module 113 conducts data discovery, and saves any data to the data cache 114. In block 420, the main problem detector 112 is invoked, and in block 425, the individual detectors 116 are run. In block 430, the resolver 131 determines if any problems were detected. In block 430, if no problems were detected, or if only old problems were detected, the operation 400 moves to block 435. In block 430, if new problems were detected, the operation 400 moves to block 440, and the problem detector screen displays the new problems. The operation 400 then moves to block 445, the user closes the problem detector screen, and the operation 400 moves to block 435. In block 435, the main application is presented. The operation 400 then moves to end block 450 and the operation 400 ends.

Figure 6A:
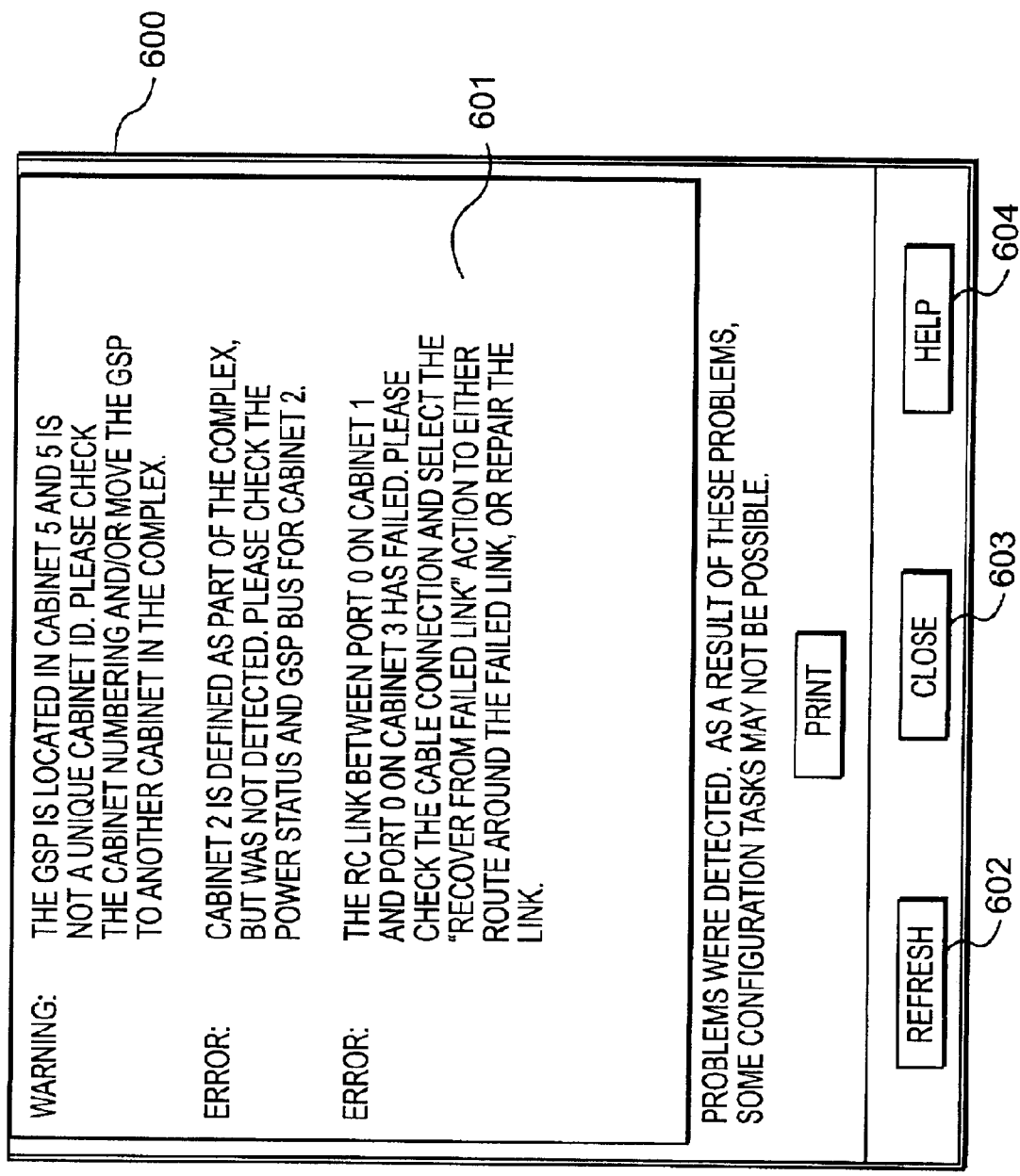
FIGS. 6A–6B illustrate user interfaces for reporting problems detected by the problem detection system of FIG. 2.

FIG. 6A shows a problem detector screen 600 that may be used with the problem detection system of FIG. 2. The problem detector screen 600 may be invoked when the user selects >check_system_health< from the application menu. The problem detector screen 600 may also be invoked upon start-up of the problem detection system 100, or upon an explicit rescan or refresh. The problem detector screen 600 may include a dialog box 601 that displays all detected problems within the computer system 10. Text associated with any specific problem may also indicate that related configuration tasks cannot be performed while the specific problem exists. The problem detector screen 600 includes a REFRESH button 602, a CLOSE button 603 and a HELP button 604. The user may push the REFRESH button 602, which causes all state information to be cleared from the individual detectors 116, and invokes the problem detection system 100 to re-detect and to redisplay all problems. Pressing the CLOSE button 603 transfers control back to the main program.

Figure 6B:
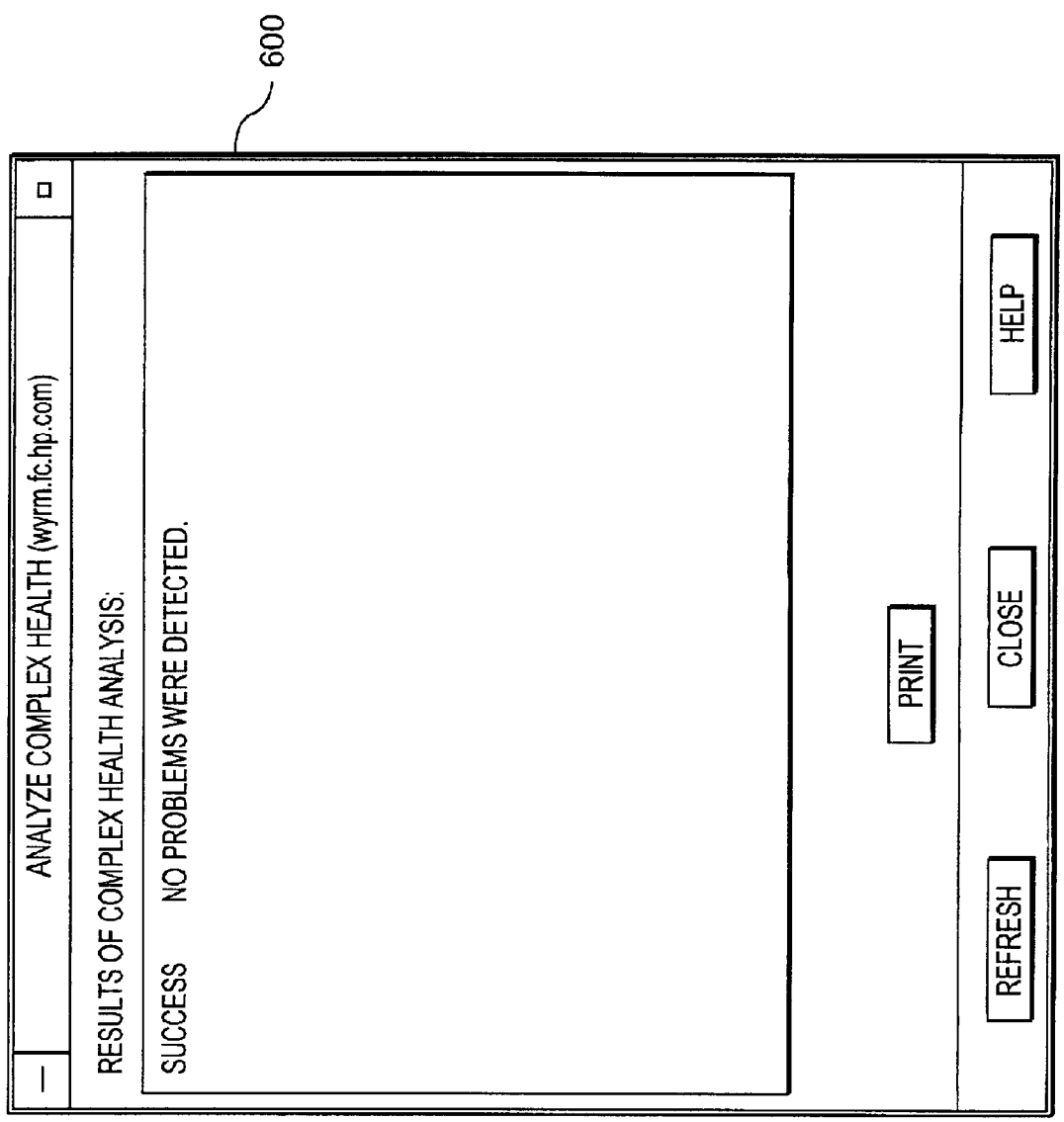

FIG. 6B illustrates the problem detection screen 600 when no problems are detected.

What is claimed is:

1. A method for detecting problems in a computer system using a problem detection tool, comprising:
presenting an application menu, wherein the application menu includes selections for run problem detection routine and refresh application data;
invoking a main problem detection routine upon receipt of the refresh application data;
invoking individual problem detection routines based on the main problem detection routine;
detecting one or more problems in the computer system;
determining if the one or more detected problems are one of new problems and old problems;
if all the one or more detected problems are old problems, presenting an application program;
if one or more of the one or more detected problems are new problems, displaying the new problems; and
receiving a user instruction to close the problem display.

2. The method of claim 1, wherein the main problem detection routine is invoked upon startup of the problem detection tool, further comprising:
presenting a user with an option to continue or not continue:
if the user chooses to continue, presenting the application program; and
if the user chooses not to continue, terminating the application program.

3. The method of claim 2, wherein the step of invoking the problem detection routine launches a data discovery routine, further comprising storing the discovered data.

4. The method of claim 1, wherein the main problem detection routine detects the one or more problems, further comprising:
displaying all problems.

5. The method of claim 1, wherein the step of invoking the problem detection routine launches a data discovery routine, further comprising storing the discovered data.

6. The method of claim 1, further comprising storing the detected problems.

7. The method of claim 1, wherein the detected problems are hardware problems.

8. A problem detection mechanism used with a system management program for use in a computer system, comprising:
a main problem detector, comprising one or more individual problem detectors, wherein each of the one or more individual problem detectors is based on a specific potential problem in the computer system, wherein the individual problem detectors detect the specific potential problems when existing, and wherein the main problem detector is invoked upon receipt of a refresh application data;
a problem resolver that determines if a detected problem is a new problem or an old problem;
an interface module that presents information related to the computer system to a user, wherein the interface module comprises an application menu, wherein the application menu includes selections for the run problem detection routine and refresh application data, and wherein:
if all the detected problems are old problems, the interface module presents an application program, and
if one or more of the detected problems are new problems, the interface module displays the new problems, wherein the problem detection mechanism receives a user instruction to close the problem display.

9. The mechanism of method of claim 8, wherein the main problem detector routine is invoked upon startup of the problem detection mechanism, and wherein the interface module presents a user with an option to continue or not continue, wherein:
if the user chooses to continue, the interface module presents the application program; and
if the user chooses not to continue, the application program terminates.

10. The mechanism of claim 9, further comprising:
a data discovery module, wherein invoking the problem detector routine starts the data discovery module; and
a data cache coupled to the data discovery module, wherein data discovered by the data discovery module is stored.

11. The mechanism of claim 8, wherein the main problem detector detects the one or more problems, wherein the interface module displays all problems, the interface module further comprising a mechanism whereby the user may designate an instruction to close the problem display.

12. The mechanism of claim 8, further comprising a problem cache, wherein detected problem information is stored.

13. The mechanism of claim 8, wherein the detection problems are hardware problems.

* * * * *